United States Patent [19]
Reavell et al.

[11] Patent Number: 6,107,915
[45] Date of Patent: Aug. 22, 2000

[54] SYSTEM AND METHOD OF PROMPTING INSPECTION OF A MULTI-PASSENGER VEHICLE

[75] Inventors: James A. Reavell, Campbellford; William R. Phillips, Belleville, both of Canada

[73] Assignee: B.M.R. Mfg. Inc., Campbellford, Canada

[21] Appl. No.: 09/113,161

[22] Filed: Jul. 10, 1998

[30] Foreign Application Priority Data

May 13, 1998 [CA] Canada ................................. 2237415

[51] Int. Cl.⁷ ........................................................ B60Q 1/26
[52] U.S. Cl. ........................ 340/433; 340/425.5; 340/430; 340/457; 340/309.4
[58] Field of Search ................................. 340/429, 433, 340/457, 430, 527, 523, 309.15, 309.4, 425.5

[56] References Cited

U.S. PATENT DOCUMENTS

| | | | |
|---|---|---|---|
| 4,866,417 | 9/1989 | DeFino et al. | 340/430 |
| 5,128,651 | 7/1992 | Heckart | 340/433 |
| 5,243,323 | 9/1993 | Rogers | 340/433 |
| 5,874,891 | 2/1999 | Lowe | 340/433 |

FOREIGN PATENT DOCUMENTS 2238249  11/1998  Canada .

*Primary Examiner*—Donnie L. Crosland
*Attorney, Agent, or Firm*—Dimock Stratton Clarizio; Mark B. Eisen

[57] ABSTRACT

A warning system for a multi-passenger vehicle such as a school bus which prompts the driver to inspect the vehicle for passengers when shutting down the vehicle. In the preferred embodiment the system is activated when the vehicle safety flasher system is activated. Following activation an alarm sounds when the vehicle electrical system is deactivated by shutting off the engine unless the bus driver activates an alarm delay switch and within a preset time interval activates a disarming switch located near the back of the passenger compartment. Thus, in order to deactivate the warning system of the invention the bus driver must walk through the passenger area of the vehicle at least twice, inspecting the passenger area of the vehicle in the process. The time taken to inspect the vehicle serves as a cool-down period for the vehicle engine, which is desirable in the case of turbo charged vehicle engines.

19 Claims, 2 Drawing Sheets

SYSTEM AND METHOD OF PROMPTING INSPECTION OF A MULTI-PASSENGER VEHICLE

FIELD OF INVENTION

This invention relates to warning systems. In particular, this invention relates to a warning system for a multi-passenger vehicle such as a school bus which prompts the driver to inspect the vehicle for passengers when shutting down the vehicle, and a method therefor.

BACKGROUND OF THE INVENTION

Many drivers of multi-passenger vehicles have encountered a situation in which a passenger has fallen asleep and failed to debark from the vehicle at their appointed destination. In the case of school buses this is particularly problematic for a number of reasons. Children tend to be lulled to sleep relatively easily by the motion of a vehicle, particularly at the end of a school day, and children in neighbouring seats are less likely to notice or to alert the driver when this happens.

It has been known to happen that a school bus driver parks the bus at the storage compound and leaves the bus for the evening with a sleeping child still on board. When this happens the results can be disastrous, especially to a young child who will awake to strange surroundings and may not know how to deal with being stranded or find their way home, leaving the child's parents in a panic and school officials trying to trace the child's whereabouts after all adults have left for the day.

Accordingly many multi-passenger vehicle operators, particularly school bus operators, require that each driver inspect his or her bus carefully for sleeping passengers before leaving the bus at the end of a run. Unfortunately, human nature often prevails and the bus driver who is in a hurry or distracted may not inspect the bus as required.

Further, in a multi-passenger vehicle with a turbo charged engine it is desirable to observe a "cool-down" period of several minutes when parking the vehicle 10 at the end of a run, before turning off the engine. Many drivers fail to wait the entire cool-down period before shutting down the vehicle, which can result in premature deterioration of the engine systems.

It would accordingly be advantageous to provide a warning system that prompts the driver of a multi-passenger vehicle to inspect the vehicle for sleeping passengers before shutting down the vehicle. However, to be effective in all situations such a system must be designed with the hurried or distracted driver in mind, and the driver must not be able to circumvent the warning system, while at the same time the driver must be able to disarm the warning system once the required inspection has been performed. It would further be advantageous to combine such a warning system with a means for encouraging a driver of a multi-passenger vehicle with a turbo-charged engine to delay shutting off the engine at the end of a run until the required cool-down period has elapsed.

SUMMARY OF THE INVENTION

The present invention provides a warning system for a multi-passenger vehicle such as a school bus which prompts the driver to inspect the vehicle for passengers before shutting down the vehicle. The system of the invention is easy to install into existing vehicles and difficult for a bus driver to circumvent.

In the preferred embodiment the system of the invention is armed when the vehicle safety flasher lights are activated. When the system is armed an alarm, in the preferred embodiment the vehicle horn, will sound immediately upon deactivation of the vehicle electrical system when the vehicle engine is shut off, unless the bus driver first activates an alarm delay switch and then, within 30 seconds (or any other desired interval), activates a disarming switch located in the vicinity of the back of the passenger compartment at the rear of the vehicle. Thus, in order to disarm the warning system of the invention the bus driver must walk through the passenger area of the vehicle twice—once to activate the disarming switch and again to return to the driver's compartment to shut off the engine before exiting the vehicle. Any passenger still on the bus during this inspection will be noticed by the driver and arrangements can be made to deliver the passenger to his or her intended destination.

The time taken to inspect the vehicle also serves as a cool-down period for the vehicle engine, which is desirable in the case of turbo charged vehicle engines. Also, in the preferred embodiment the system of the invention allows the vehicle engine to be shut off while the vehicle safety flashers are on without activating the alarm, which is desirable in certain jurisdictions where the driver will shut off the engine to assist in the loading and unloading of passengers, and then restart the engine when he or she returns to the vehicle.

In a further embodiment, when the system of the invention is armed an alarm will sound 30 seconds (or any other selected interval) after the vehicle master light switch or the vehicle engine is deactivated unless the bus driver activates a disarming switch located near the back of the passenger compartment at the rear of the vehicle.

The present invention thus provides, for a multi-passenger motor vehicle having a passenger compartment disposed to the rear of a driver compartment, a warning system comprising a system activator comprising an arming switch to arm the warning system, the system activator being thereby latched into an activated state, an alarm, an alarm activator for activating the alarm, the alarm activator being activated when an electrical system of the vehicle is deactivated, and a system deactivator comprising a disarming switch for deactivating the warning system, whereby the disarming switch comprises an indicator switch for an emergency exit door located at a rear portion of the passenger compartment so that a driver of the vehicle must traverse the passenger compartment and open the emergency exit door in order to deactivate the warning system.

The present invention further provides, for a multi-passenger vehicle having a passenger compartment disposed to the rear of a driver compartment, a warning system comprising a system activator comprising an arming switch to arm the warning system, the system activator being thereby latched into an activated state, a system deactivator comprising a disarming switch, an alarm delay switch for delaying activation of the alarm by a selected delay interval following deactivation of an electrical system of the vehicle, and an alarm activated immediately when the electrical system is deactivated while the warning system is armed unless the alarm delay switch has been activated, whereby the warning system is deactivated by the disarming switch which is located near a rear of the passenger compartment so that the driver must traverse the passenger compartment to activate the disarming switch and deactivate the warning system in order to avoid activation of the alarm, activation of the alarm being delayed for the selected delay interval following deactivation of the electrical system when the alarm delay switch is activated.

The present invention further provides a method of prompting a driver of a multi-passenger motor vehicle having a passenger compartment disposed to the rear of a driver compartment to inspect the passenger compartment before shutting off the vehicle engine, comprising the steps of arming a warning system during use of the vehicle, activating an alarm when an electrical system of the vehicle is deactivated while the warning system is armed, initiating an alarm delay interval by activating an alarm delay switch before shutting off the vehicle engine, and activating a disarming switch located at a rear portion of the passenger compartment within the delay interval to disarm the warning system, whereby a driver of the vehicle must traverse the passenger compartment after in order to activate the disarming switch to thereby disarm the warning system.

BRIEF DESCRIPTION OF THE DRAWINGS

In drawings which illustrate by way of example only a preferred embodiment of the invention.

DETAILED DESCRIPTION OF THE INVENTION

Figure 1:
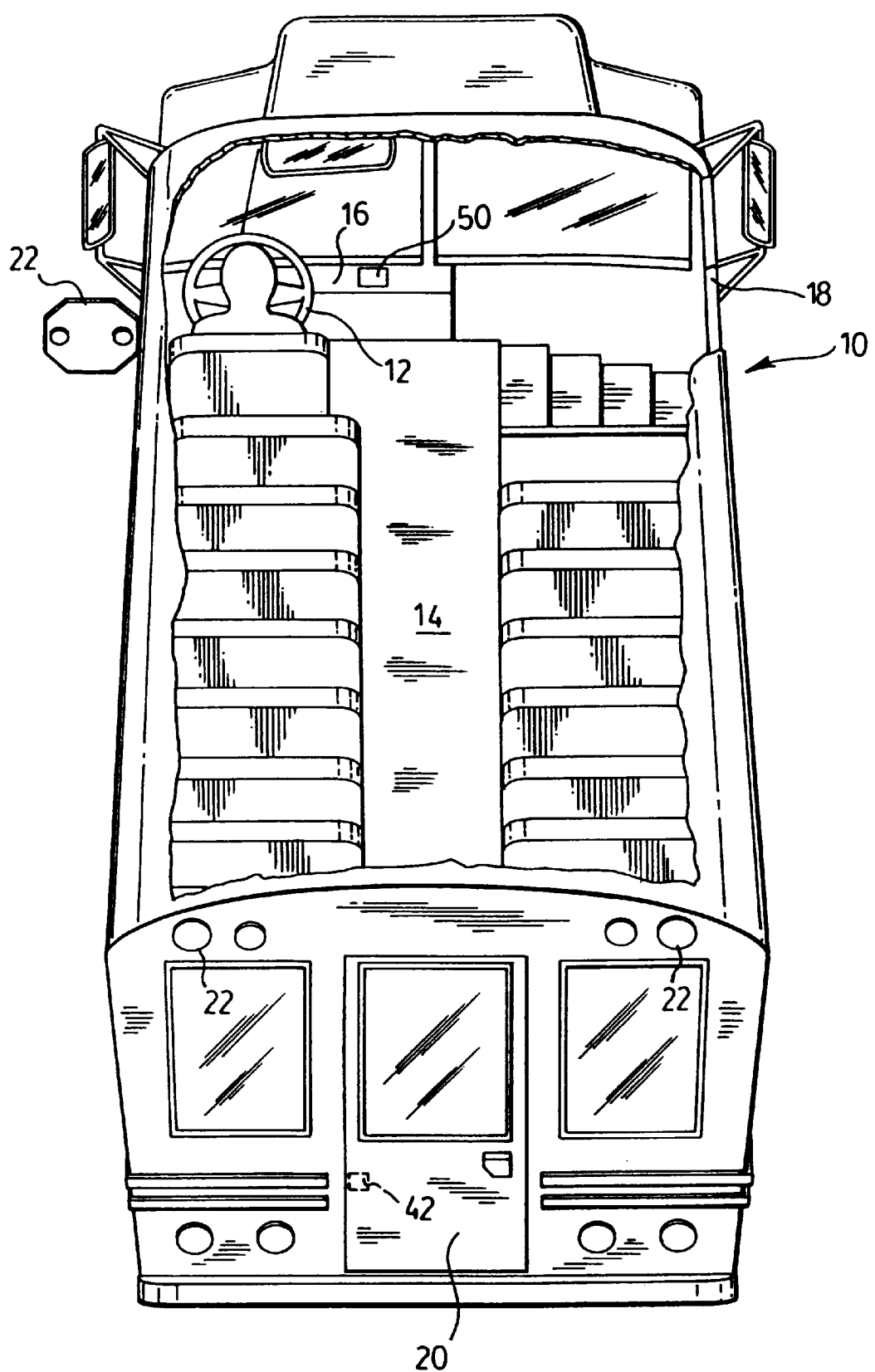
FIG. 1 is a schematic view of a multi-passenger vehicle utilizing the system of the invention.

FIG. 1 illustrates a multi-passenger vehicle 10 such as a school bus embodying the invention. The vehicle 10 conventionally comprises a driver compartment 12 located at the front of the vehicle 10 and a passenger compartment 14 located to the rear of the driver compartment 12. The driver compartment 12 is provided with the controls and indicators necessary to operate the vehicle 10, many of which are located on the dashboard 16. The vehicle 10 includes an exit door 18 adjacent to the driver compartment 12. In the case of a school bus the vehicle 10 is also provided with a safety exit comprising emergency exit door 20 at the rear of the vehicle 10 for use in emergencies, and safety flashers 22 for signalling passing traffic to stop when passengers are being loaded and unloaded from the vehicle 10.

Figure 2:
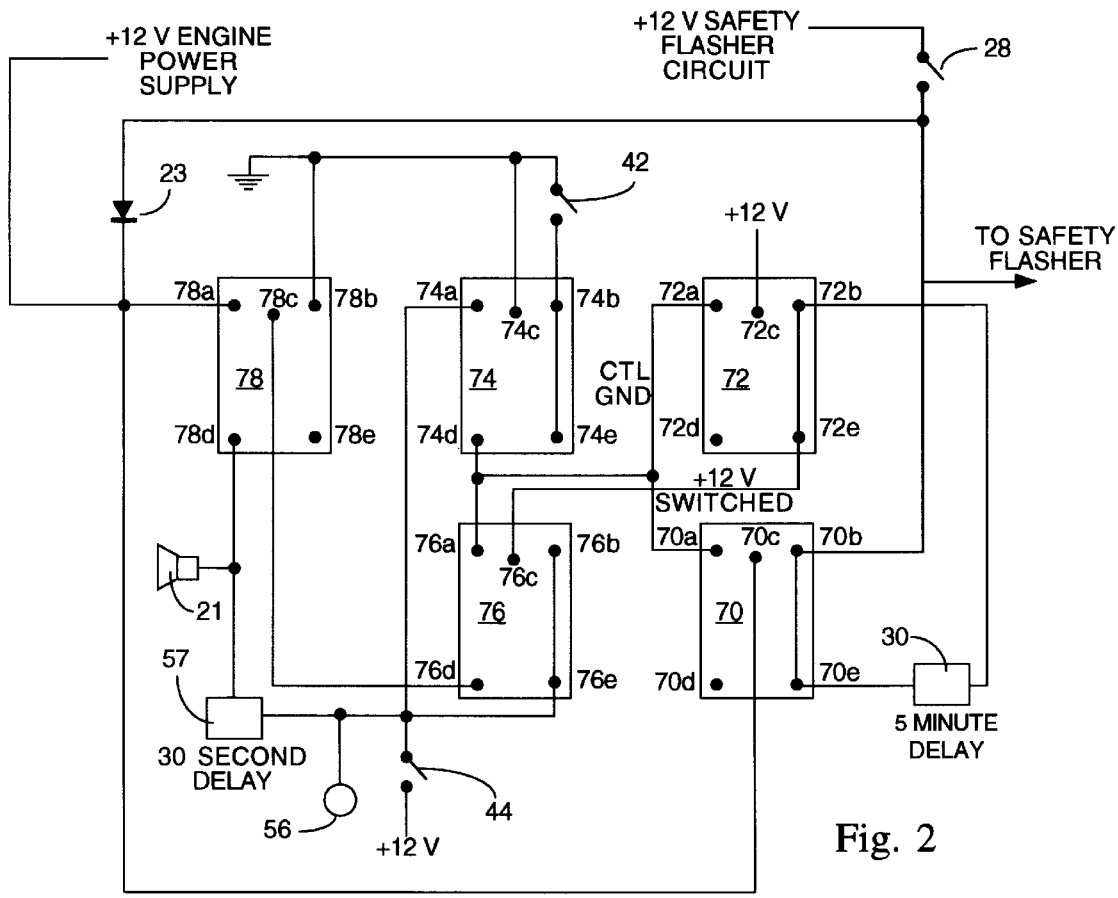
FIG. 2 is a schematic diagram illustrating a preferred embodiment of the invention.

A preferred embodiment of the circuitry for the system of the invention is illustrated in FIG. 2. The warning system of the invention comprises a system activator, an alarm activator and a system deactivator. In the preferred embodiment the system activator is connected to the vehicle electrical circuit powering the safety flashers 22, so that activation of the safety flashers 22 arms the warning system. In the case of a school bus the safety flashers 22 are always used when passengers are being loaded or unloaded from the vehicle 10. If the vehicle engine is started but the safety flashers 22 are not activated, the warning system is not armed which allows an automobile mechanic or other personnel to inspect, test, relocate or repair the vehicle 10 without arming the warning system. However, the warning system may in alternative embodiments be activated by turning on the vehicle electrical systems when starting the engine, or by activating any electrical switch already provided in the vehicle 10 so long as the switch is one which would normally be activated before or during the unloading of passengers from the vehicle 10. If the system is armed by activating the vehicle electrical system, it would be useful to provide a mechanic bypass so that the vehicle 10 can be relocated, serviced etc. without arming the warning system.

The embodiment illustrated in FIG. 2 is particularly suitable for a multi-passenger vehicle 10 with a turbocharged engine. In such vehicles it is desirable to allow a "cool-down" period of several minutes when parking the vehicle 10 before turning off the engine. This embodiment provides a mechanism for encouraging the driver to wait for the cool-down period before shutting off the vehicle engine.

This embodiment also allows the bus driver to deactivate the warning system after the last passenger has been unloaded, but before the end of a run. This can be advantageous by encouraging inspection of the passenger compartment immediately upon unloading the last passenger, so if a passenger has fallen asleep or failed to leave the bus at their intended destination the driver will notice this before returning to the vehicle storage compound and can deliver the passenger to the intended destination more quickly.

In this embodiment, when the warning system is armed by activation of the vehicle safety flashers 22, the alarm 21 sounds as soon as the vehicle electrical system is deactivated unless the driver first activates an alarm delay switch 44 located near the driver compartment 12, for example on the dashboard 16 or on a conveniently located control box 50 which may be located on or under the dashboard 16 or otherwise near the driver compartment 12, as shown in FIG. 1. The delay switch 44 initiates an alarm delay interval of 30 seconds (or as otherwise selected), following which the driver must traverse the passenger compartment 14 to activate the disarming switch 42, preferably (but not necessarily) the emergency exit "door open" indicator switch as shown in FIG. 1. The driver may then shut off the engine without activating the alarm. The time spent by the driver deactivating the warning system and returning to the driver compartment 14 serves as a minimum cool-down period for the vehicle engine.

If desired a flashing indicator light or other timed cool-down indicator (not shown) may be provided on the control box 50 or any other convenient location to indicate to the driver when the cool-down period has elapsed, for example by flashing for 2 minutes after the alarm delay switch 44 is activated or for 100 seconds after the disarm switch 42 is acivated. The cool-down indicator may be programmed to continue flashing, for example for 30 minutes, if the vehicle engine is shut down before the cool-down period has elapsed, to serve as an indication to service personnel that the vehicle was not shut down properly.

The embodiment shown in FIG. 2 utilizes conventional relays 70, 72, 74, 76 and 78 for switching, for purposes of illustration. Each relay has a relay coil powered through coil terminals designated "a" and "b", and a wiper coupled to a wiper terminal designated "c" contacting a normally closed (NC) contact designated "d" when the relay is in the quiescent state and a normally open (NO) contact designated "e" when the relay is activated. It will be appreciated by those skilled in the art that the switching logic illustrated can be implemented by transistors, by preprogrammed hardware or software, or any combination of these, and the invention is not intended to be limited to the specific embodiment shown.

The device is preferably powered by the vehicle electrical power supply, and accordingly shown a 12 V embodiment is shown by way of example. However, any other suitable power source may be employed.

In the embodiment of FIG. 2 the system activator comprises system activation relay 70, system arming relay 72 and system arming switch 28, in the preferred embodiment the master switch for safety flashers 22, connected to coil terminal 70b. The coil of system activation relay 70 is energized when the arming switch 28 is activated while disarming relay 74 is in the quiescent state so that grounded wiper terminal 74*c* completes a circuit through NC contact 74*d* to coil terminal 70*a*. Wiper terminal 70*c* carries +12 V from the vehicle safety flasher circuit through NO contact 70*e*, latching relay 70 and, through 5 minute arming delay circuit 30, latching system arming relay 72 after the 5 minute arming delay interval (the 5 minute delay is preferred to give maintenance personnel an opportunity to test the safety flashers 22 without arming the warning system). Relays 70 and 72 can then only be unlatched by the removal of CTL GND from coil terminals 70*a* and 72*a*.

The +12 V switched supply from contact 72*e* is fed to wiper terminal 76*c* of alarm activation relay 76, and through NC contact 76*d* to wiper contact 78*c* of reset relay 78. When alarm delay switch 44 (which may be a momentary push-button switch) is activated, +12 V from any active fused electrical circuit energizes alarm activation relay 76, optionally activates a countdown indicator 56 which may be a flashing LED, and starts 30 second delay circuit 57 to initiate the 30 second countdown to alarm activation. The alarm 21 will sound when the vehicle electrical system is switched off and reset relay 78 goes quiescent unless disarming switch 42 is activated within the 30 second delay interval to remove the CTL GND from NC contact 74*d*, which unlatches alarm activation relay 76, system activation relay 70 and system arming relay 72 to cut off the 12 V switched power supply and disarm the warning system. If the disarming switch 42 is not activated within the 30 second delay interval the alarm sounds, but will stop sounding as soon as disarming switch 42 is activated to remove the CTL GND from NC contact 74*d* and deactivate the warning system.

In the preferred embodiment the disarming switch 42 is the switch for the emergency exit door 20, which considerably simplifies the installation of the warning system because in general the emergency exit door switch is already wired to an indicator such as a buzzer under the vehicle dashboard 16. Since the emergency exit door 20 cannot be easily operated by a child, a school bus driver cannot have one of the passengers activate the disarming switch 42 in order to avoid walking to the rear of the vehicle 10. Also, this results in the emergency exit door 20 being opened regularly, so that a door 20 which has seized or malfunctioned through disuse can be immediately identified.

In operation, the driver starts the vehicle and proceeds to pick up or drop off passengers. As the first passenger is loaded or unloaded the driver switches on the light switch 28 for the safety flashers 22, to stop nearby traffic. This initiates the 5 minute arming delay, so that if the vehicle electrical system remains on for the ensuing 5 minutes the warning system is armed. As noted above, the 5 minute delay is provided to give maintenance personnel an opportunity to test the safety flashers 22 without arming the warning system. The warning system of the invention could be equally implemented without any arming delay.

Thereafter, as soon as the vehicle electrical system is deactivated to shut off the vehicle engine the alarm sounds unless the driver first activates the alarm delay switch 44 and within the 30 second (or as otherwise selected) delay interval activates the disarming switch 42 at the rear of the vehicle 10. The driver is thus required to walk through the passenger compartment 14 to the rear of the vehicle 10 and open the emergency exit door 20 to disarm the warning system.

The preset alarm delay interval is preferably 30 seconds, but may be longer or shorter depending upon the size of the vehicle 10. In the preferred embodiment a flashing LED or other indicator 56 signals the driver that the alarm delay switch 44 has been activated, so that the driver realizes that the alarm 21 will sound unless the disarming switch 42 is closed within the alarm delay interval. In the preferred embodiment the control box 50 may also provide status information via a "power on" indicator light and a "system armed" indicator light (not shown).

The embodiment shown is designed for a vehicle in which the horn is permanently grounded and activated by a +12 V switched power supply. In some vehicles the horn is permanently connected to a +12 V switched power supply and activated through a switched ground circuit. It may be beneficial to provide both options in the warning system, and during installation the installer would select the connection suitable for the particular vehicle 10 into which the system is being installed.

In the preferred embodiment the warning system of the invention is provided with an override which allows the driver to shut off the vehicle engine without disarming the warning system as long as the safety flashers 22 are on. This allows the driver to shut off the engine to assist in the loading and unloading of passengers, and then restart the engine when he or she returns to the vehicle, as is the practice in certain jurisdictions, without activating the alarm 21. Thus, the +12 V power supply for the safety flasher 22 is coupled to the +12 V engine power supply to coil terminal 78*a* through diode 23, so that the engine can be shut off without de-energizing reset relay 78. The vehicle engine must be restarted before the safety flashers 22 are shut off or the alarm 21 will sound as the +12 V supply is eliminated from coil terminal 78*a*.

Figure 3:
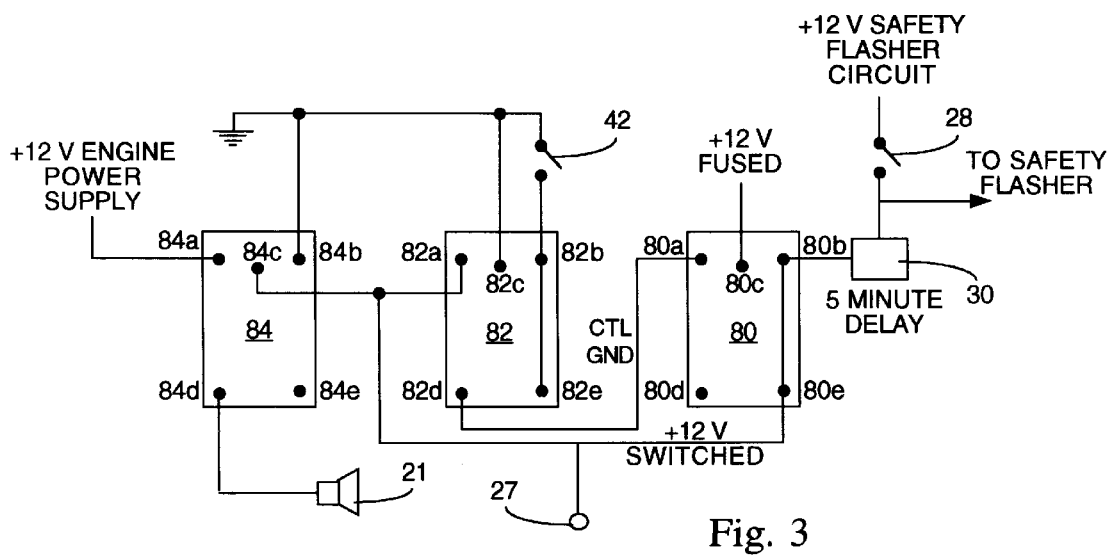
FIG. 3 is a schematic diagram illustrating a further preferred embodiment of the invention.

A simplified embodiment of the invention is illustrated in FIG. 3. The system activator comprises an arming switch 28 and system arming relay 80 having a coil with terminals 80*a*, 80*b*, a wiper with terminal 80*c* biased to normally closed (NC) contact 80*d* when the relay is quiescent and to normally open (NO) contact 80*e* when the relay is energized. Wiper terminal 80*c* is connected to a constant +12 V fused circuit which is activated when the vehicle electrical system is activated, to provide a 12 V switched power supply to the warning system. The coil of system arming relay 80 is energized by switch 28, which in the embodiment shown is the master light switch 28 for the vehicle safety flashers 22, connected to one coil terminal 80*b* through arming delay 30. Arming delay 30 initiates a 5 minute (or as otherwise selected) delay countdown before momentarily energizing relay 80. The other coil terminal 80*a* is grounded through disarming relay 82 in the quiescent state, as described below. The coil terminal 80*b* is also connected to NO terminal 80*e*, so that when system arming relay 80 is energized terminals 80*e* and 80*b* go high to latch system arming relay 80 into the energized state. Relay 80 can then only be reset by the removal of CTL GND from coil terminal 80*a* to break the circuit through the coil. The warning system is now armed, as may be shown by optional SYSTEM ARMED indicator light 27.

The alarm activator comprises alarm activation relay 84. When the warning system is armed, the +12 V switched supply from NO contact 80*e* is applied to the wiper terminal 84*c* of alarm activation relay 84. One of the coil terminals 84*b* is grounded, and the other coil terminal 84*a* is connected to the vehicle electrical system. Thus, when the vehicle electrical system is active (i.e., the vehicle engine is on) the alarm activation relay 84 wiper is held picked to NO contact 84*e*. When the vehicle electrical system is deactivated the alarm activation relay coil 84 goes quiescent, and if the warning system is armed, the +12 V switched supply is fed through NC contact 84*d* to an alarm 21, preferably the vehicle horn as in the embodiment illustrated. The the alarm will sound and continue to sound until disarming switch 42 is activated.

The system deactivator comprises disarming relay 82 and disarming switch 42. The +12 V switched supply from NO contact terminal 80*e* is applied to one of the coil terminals 82*a* of disarming relay 82, and the other coil terminal 82*b* is grounded through disarming switch 42 so the disarming relay remains quiescent until switch 42, for example the emergency exit "door open" indicator switch, is activated.

The wiper terminal 82*c* of disarming relay 82 is grounded, and the NC contact 82*d* connected to terminal 80*a* of the coil for relay 80 keeps system arming relay 80 latched and supplying +12 V to coil terminal 82*a*. When the emergency exit door 20 is opened, disarming switch 42 grounds the coil terminal 82*b* to energize the relay 82, moving the wiper to the NO contact 82*e* and thereby breaking the CTL GND connection to system arming relay coil terminal 80*a*, unlatching the system arming relay 80, breaking the +12 V switched supply circuit from alarm activation relay 84 and disarming the warning system.

In the operation of the embodiment of FIG. 3, the warning system is armed if the vehicle engine remains on for 5 minutes after the safety flashers 22 are activated. As soon as the vehicle electrical system is deactivated by shutting off the vehicle engine the alarm 21 sounds. The only way to avoid an alarm condition is for the driver to walk through the passenger compartment 14 to the rear of the vehicle 10 and open the emergency exit door 20, activating disarming switch 42 and disarming the warning system as described above.

This embodiment does not encourage the driver to observe a minimum cool-down period for the vehicle engine and is thus less suitable for turbo charged vehicles, but allows the driver to disarm the warning system after the last passenger has been unloaded and before returning to the vehicle storage compound, and otherwise provides the advantages described above. If the driver tries to disarm the warning system before the last passenger is unloaded, the warning system will re-arm 5 minutes after the safety flashers 22 are turned on to unload passengers.

Preferred embodiments of the invention having been thus described by way of example only, it will be apparent to those skilled in the art that certain modifications and adaptations may be made without departing from the scope of the invention, as set out in the appended claims. Without limiting the foregoing, the principles of the invention have been described in the context of a preferred embodiment which utilizes relays, however it will be apparent to those skilled in the art that the switching logic illustrated can be implemented by transistors, integrated circuits or other preprogrammed hardware or software, or any combination of these, and the invention is not intended to be limited to the specific embodiments illustrated.

We claim:

1. For a multi-passenger motor vehicle having a vehicle safety flasher and a passenger compartment disposed to the rear of a driver compartment, a warning system comprising a system activator comprising an arming switch to arm the warning system, the system activator being thereby latched into an activated state, an alarm, an alarm activator for activating the alarm, the alarm activator being activated when an electrical system of the vehicle is deactivated unless an alarm override is activated, a system deactivator comprising a disarming switch for deactivating the warning system, and an alarm override comprising a circuit powering the vehicle safety flasher, for maintaining the alarm activator in an activated state when the vehicle safety flasher is in an activated state, whereby when the vehicle safety flasher is activated the alarm activator is not activated when the electrical system of the vehicle is deactivated.

2. The warning system of claim 1 in which the arming switch comprises a switch for activating a vehicle safety flasher circuit.

3. The warning system of claim 1 in which the alarm activator activates the alarm immediately upon deactivation of the electrical system.

4. The warning system of claim 1 in which the alarm activator activates the alarm after a preset interval following deactivation of the electrical system.

5. The warning system of claim 1 in which the system activator comprises a delay circuit which delays activation of the warning system for a preset interval.

6. The warning system of claim 1 in which the system activator comprises a relay which is latched to an energized condition upon activation of the arming switch.

7. The warning system of claim 1 in which the alarm comprises a horn of the vehicle.

8. For a multi-passenger vehicle having a passenger compartment disposed to the rear of a driver compartment, a warning system comprising a system activator comprising an arming switch to arm the warning system, the system activator being thereby latched into an activated state, a system deactivator comprising a disarming switch, an alarm delay switch for delaying activation of the alarm by a selected delay interval following deactivation of an electrical system of the vehicle, and an alarm activated immediately when the electrical system is deactivated while the warning system is armed unless the alarm delay switch has been activated, whereby the warning system is deactivated by the disarming switch which is located near a rear of the passenger compartment so that the driver must traverse the passenger compartment to activate the disarming switch and deactivate the warning system in order to avoid activation of the alarm, activation of the alarm being delayed for the selected delay interval following deactivation of the electrical system when the alarm delay switch is activated.

9. The warning system of claim 8 in which the arming switch comprises a switch for activating a vehicle safety flasher circuit.

10. The warning system of claim 8 in which the disarming switch comprises a door indicator switch for an emergency exit door located at the rear of the passenger compartment.

11. The warning system of claim 8 in which the alarm delay switch is located near the driver compartment.

12. The warning system of claim 8 in which the system activator comprises a relay which is latched to an energized condition upon activation of the arming switch.

13. The warning system of claim 8 in which a vehicle safety flasher circuit override is provided so that the alarm is not activated when the electrical system is deactivated if the vehicle safety flasher is on.

14. A method of prompting a driver of a multi-passenger motor vehicle having a passenger compartment disposed to the rear of a driver compartment to inspect the passenger compartment before shutting off the vehicle engine, comprising the steps of
- a) arming a warning system during use of the vehicle,
- b) activating an alarm when an electrical system of the vehicle is deactivated while the warning system is armed,
- c) initiating an alarm delay interval by activating an alarm delay switch before shutting off the vehicle engine, and
- d) activating a disarming switch located at a rear portion of the passenger compartment within the delay interval to disarm the warning system, whereby a driver of the vehicle must traverse the passenger compartment after in order to activate the disarming switch to thereby disarm the warning system.

15. The method of claim 14 in which the step of arming the warning system is performed by activating a vehicle safety flasher circuit.

16. The method of claim 14 in which the step of disarming the warning system is performed by opening an exit door at the rear of the passenger compartment.

17. The method of claim 14 in which the alarm delay switch is located near the driver compartment.

18. The method of claim 14 in which the alarm is energized after a preset delay interval.

19. The method of claim 14 including the step of delaying arming of the warning system for a preset interval.

* * * * *